US006951578B1

(12) United States Patent
Belnap et al.

(10) Patent No.: US 6,951,578 B1
(45) Date of Patent: Oct. 4, 2005

(54) POLYCRYSTALLINE DIAMOND MATERIALS FORMED FROM COARSE-SIZED DIAMOND GRAINS

(75) Inventors: Daniel J. Belnap, Pleasant Grove, UT (US); Nathan R. Anderson, Pleasant Grove, UT (US); Zhigang Fang, The Woodlands, TX (US); Anthony Griffo, The Woodlands, TX (US); Brian A. White, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/637,092

(22) Filed: Aug. 10, 2000

(51) Int. Cl.$^7$ .............................................. B32B 9/00
(52) U.S. Cl. ........................... 75/231; 419/11; 75/252; 175/374
(58) Field of Search ........................... 419/11; 75/231, 75/252; 175/374

(56) References Cited

U.S. PATENT DOCUMENTS

| | | | | |
|---|---|---|---|---|
| 3,913,280 A | * | 10/1975 | Hall ............................ | 51/307 |
| 4,303,442 A | * | 12/1981 | Hara et al. ..................... | 75/243 |
| 4,311,490 A | * | 1/1982 | Bovenkerk et al. ............ | 51/307 |
| 4,370,149 A | * | 1/1983 | Hara et al. ..................... | 51/309 |
| 4,505,746 A | * | 3/1985 | Nakai et al. ................... | 74/243 |
| 4,636,253 A | * | 1/1987 | Nakai et al. ................... | 75/239 |
| 4,772,524 A | | 9/1988 | Coblenz ....................... | 428/699 |
| 4,861,350 A | * | 8/1989 | Phaal et al. .................... | 51/307 |
| 5,011,514 A | * | 4/1991 | Cho et al. ..................... | 51/295 |
| 5,120,495 A | * | 6/1992 | Supan et al. .................. | 419/11 |
| 5,354,155 A | * | 10/1994 | Adams ........................ | 408/145 |
| 5,419,868 A | | 5/1995 | Honnorat ...................... | 419/4 |
| 5,468,268 A | * | 11/1995 | Tank et al. .................... | 51/293 |

(Continued)

FOREIGN PATENT DOCUMENTS

| | | |
|---|---|---|
| GB | 1572460 | 7/1980 |
| GB | 2315778 | 2/1998 |

OTHER PUBLICATIONS

Flaw Tolerant, Fracture Resistant, Non-Brittle Materials Produced via Conventional Powder Processing, Technological Advances, 1995 Matrice Technology Ltd., pp 131-134.
Research & Development Summaries, Advance Ceramics Research, Aug. 18, 1995, pp. 1-2.
Fibrous Monolithic Processing Technology, Advance Ceramics Research, Research & Development Summaries, May 24, 1995, pp. 1-3.
Solid Free-Body Forming/Rapid Prototyping—Advance Ceramics Research, Research & Development Summaries, May 24, 1995, pp. 1-2.

*Primary Examiner*—Daniel Jenkins
(74) *Attorney, Agent, or Firm*—Jeffer, Mangels, Butler & Marmaro LLP

(57) ABSTRACT

PCD materials of this invention comprise diamond crystals that are bonded together with a catalyst/binder material. The PCD material is prepared by combining diamond grains with a catalyst/binder material either as a premixture or by infiltration during sintering. The PCD material comprises 15 percent by volume or less diamond grains sized 20 micrometers or less. The diamond grains are pressurized under elevated temperature conditions to form the desired PCD material. PCD materials of this invention can constitute the exclusive material phase of a PCD construction, or can form one or more material phase in a multi-phase material microstructure, wherein the multiple material phase can be arranged in an ordered/oriented or random fashion. PCD materials of this invention display improved properties of impact and fatigue resistance, and functional toughness, when used in complex wear environments, when compared to conventional PCs materials comprising intentionally added fine-sized diamond grains.

28 Claims, 3 Drawing Sheets

U.S. PATENT DOCUMENTS

| | | | |
|---|---|---|---|
| 5,492,186 A | 2/1996 | Overstreet et al. | 175/374 |
| 5,505,748 A * | 4/1996 | Tank et al. | 51/293 |
| 5,645,781 A | 7/1997 | Popovic' et al. | 264/639 |
| 5,718,736 A * | 2/1998 | Onishi et al. | 51/307 |
| 5,855,996 A * | 1/1999 | Corrigan et al. | 428/212 |
| 6,063,502 A | 5/2000 | Sue et al. | 428/469 |
| 6,261,329 B1 * | 7/2001 | Ogata et al. | 51/309 |
| 6,432,150 B1 * | 8/2002 | Levashov et al. | 51/293 |

* cited by examiner

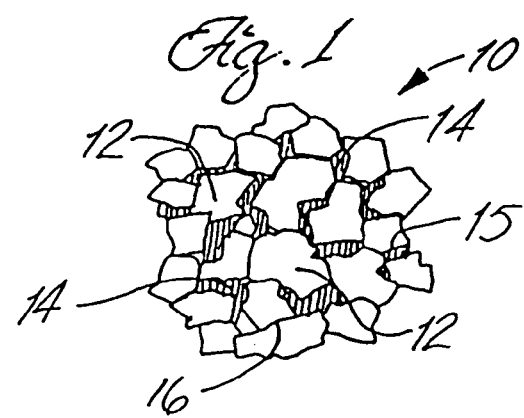
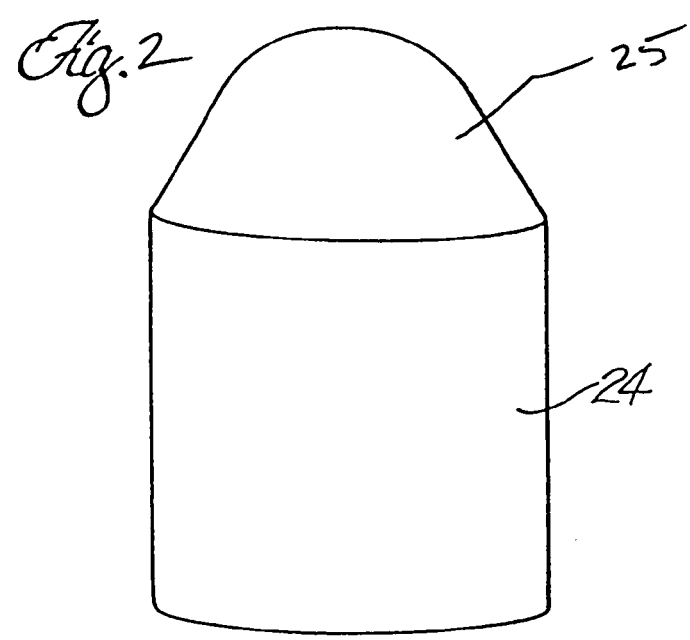

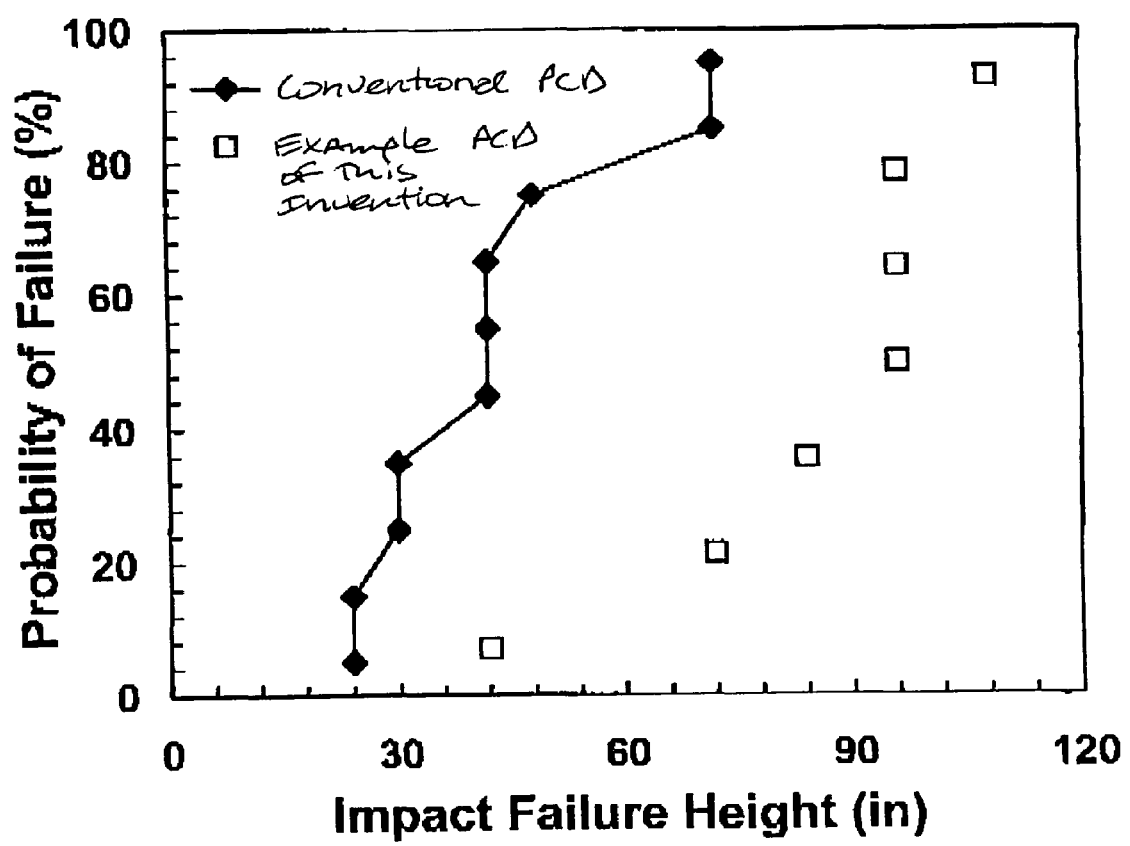

POLYCRYSTALLINE DIAMOND MATERIALS FORMED FROM COARSE-SIZED DIAMOND GRAINS

FIELD OF THE INVENTION

This invention relates to polycrystalline diamond constructions used for subterranean drilling applications and, more particularly, to polycrystalline diamond constructions comprising polycrystalline diamond materials that are formed substantially exclusively from coarse-sized diamond grains, and that provide improved properties of functional toughness when compared to conventional polycrystalline diamond constructions.

BACKGROUND OF THE INVENTION

Polycrystalline diamond (PCD) materials known in the art are formed from diamond grains or crystals and a ductile metal catalyst/binder, and are synthesized by high temperature/high pressure processes. Such PCD materials are well known for their mechanical property of high wear resistance, making them a popular material choice for use in such industrial applications as cutting tools for machining, and subterranean mining and drilling, where the mechanical property of wear resistance is highly desired. In such applications, conventional PCD materials can be provided in the form of a surface coating on, e.g., inserts used with cutting and drilling tools, to impart improved wear resistance thereto. Traditionally, PCD inserts used in such applications are formed by coating a suitable substrate material with one or more layers of PCD-based material. Such inserts comprise a substrate, a PCD surface layer, and often one or more transition layers to improve the bonding between the exposed PCD surface layer and the underlying substrate support layer. Substrates used in such insert applications are preferably formed from a carbide material, e.g., tungsten carbide (WC) cemented with cobalt (WC—Co).

The coated layer or layers of PCD conventionally may comprise a metal binder up to about 10 percent by volume. The metal binder is used to facilitate intercrystalline bonding between diamond grains, and acts to bond the layers to each other and to the underlying substrate. Metals conventionally employed as the binder are often selected from the group including cobalt, iron, or nickel and/or mixtures or alloys thereof. The binder material can also include metals such as manganese, tantalum, chromium and/or mixtures or alloys thereof. The metal binder can be provided in powder form as an ingredient for forming the PCD material, or can be drawn into the PCD material from the substrate material during the high temperature/high pressure processing.

The amount of binder material that is used to form PCD materials represents a compromise between the desired material properties of toughness and hardness/wear resistance. While a higher metal binder content typically increases the toughness of a resulting PCD material, higher metal content also decreases the PCD material hardness and corresponding wear resistance. Thus, these inversely affected desired properties ultimately limit the flexibility of being able to provide PCD coatings having desired levels of both wear resistance and toughness to meet the service demands of particular applications. Additionally, when variables are selected to increase the wear resistance of the PCD material, typically brittleness also increases, thereby reducing the toughness of the PCD material.

Conventional PCD materials comprise a large amount of fine-sized diamond grains or powder. Fine-sized diamond grains are intentionally used as a raw material for making conventional PCD materials to increase the volume fraction of diamond in the PCD material, which increases the wear resistance of the sintered PCD material. Conventional PCD materials can either be formed exclusively from fine-sized diamond grains, or can be formed from a mixture of fine-sized diamond grains with coarse-sized diamond grains. In either case, however, such conventional PCD materials rely on the intentional use of a defined proportion of fine-sized diamond grains to increase the hardness and overall wear resistance of the PCD material.

Generally, such conventional PCD materials exhibit properties of extremely high hardness, high modulus, and high compressive strength, and provide a high degree of wear protection to a cutting or drilling element. However, in more complex wear environments known to cause impact and high-load fatigue, layers formed from such conventional PCD materials are known to fail by gross chipping and spalling. For example, drilling inserts coated with a conventional PCD layer can exhibit brittleness that causes substantial problems in practical applications. The breakage and/or failure of conventional PCD materials in such applications is a result of the relatively low toughness of the material.

It is, therefore, desirable that PCD materials be developed that display improved properties of impact and fatigue resistance and functional toughness for use in complex wear environments, when compared to conventional PCD materials, while displaying acceptable wear resistance for use in the same applications.

SUMMARY OF THE INVENTION

PCD materials constructed in accordance with principles of this invention contain diamond or diamond phases prepared by using diamond grains sized 20 micrometers or greater, and comprise up to about 50 percent by volume catalyst/binder material based on the total volume of the material. PCD materials are prepared by taking the diamond grain starting material and forming it during a processing step into a green part. The green part is then subjected to high temperature/high pressure sintering to form the PCD material. During the processing step the volume percent of diamond grains sized 20 micrometers or less is increased. Post-sintered PCD materials of this invention are substantially free of fine-sized diamond grains in that they comprise 15 percent by volume or less diamond grains sized 20 micrometers or less.

PCD materials of this invention can constitute the exclusive material phase of a PCD construction, or can form one or more material phase of a multi-phase material microstructure, wherein the multiple material phases can be arranged in an ordered/oriented or random fashion. PCD materials of this invention display improved properties of impact and fatigue resistance and functional toughness when used in complex wear environments, when compared to conventional PCD materials comprising fine-sized diamond grains, while displaying acceptable wear resistance.

BRIEF DESCRIPTION OF THE DRAWINGS

These and other features and advantages of the present invention will become appreciated as the same becomes better understood with reference to the specification, claims and drawings wherein:

FIG. 1 is a schematic photomicrograph of a portion of a polycrystalline diamond material prepared according to principles of this invention;

FIG. 2 is a schematic perspective side view of an insert comprising a polycrystalline diamond material of this invention;

FIG. 4 graphically illustrates the probability of failure for rock bit inserts formed from PCD materials of this invention as compared to those formed from conventional PCD materials.

DETAILED DESCRIPTION

Figure 3:
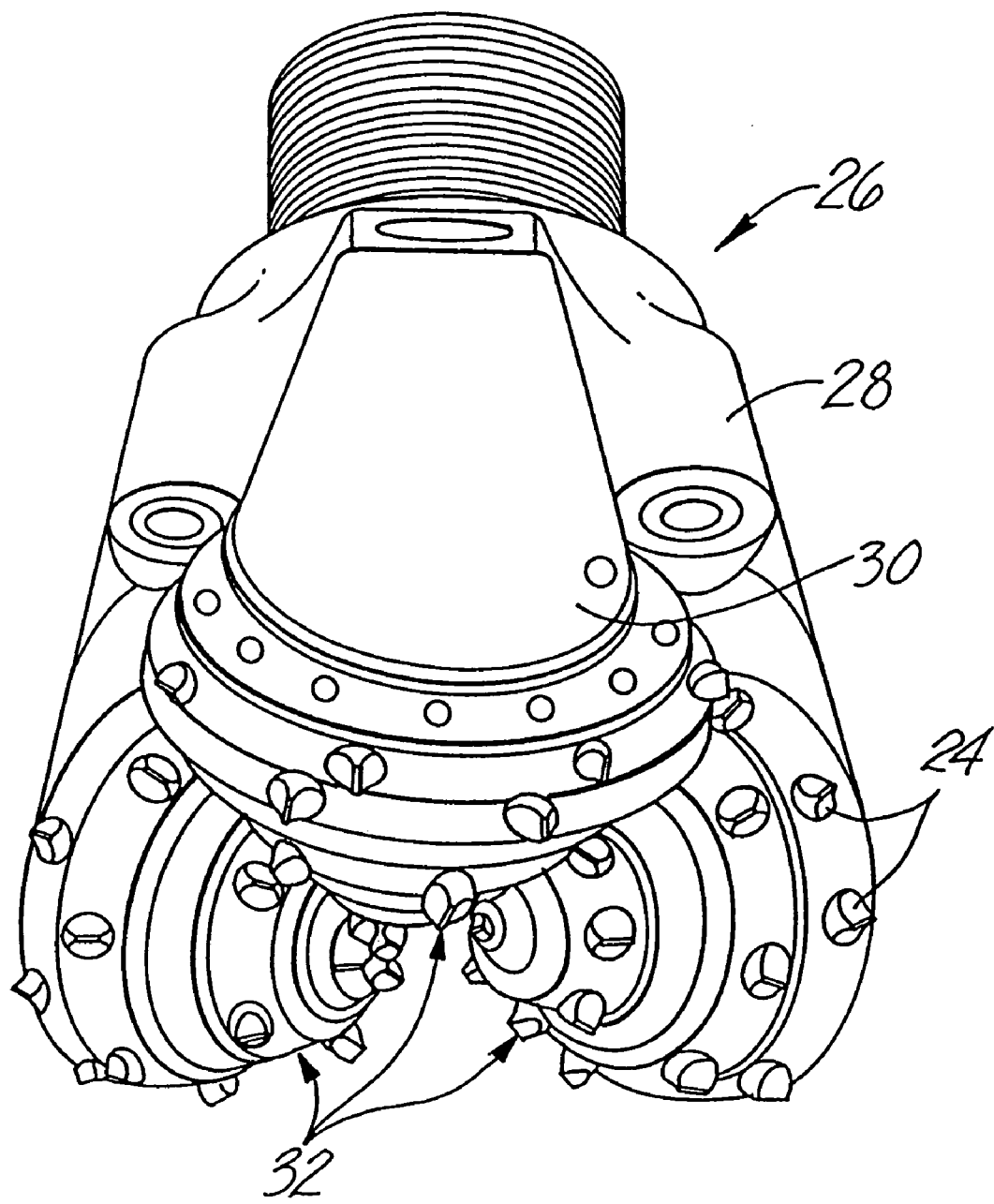
FIG. 3 is a perspective side view of a roller cone drill bit comprising a number of the inserts of FIG. 2.

As used in this specification, the term polycrystalline diamond, along with its abbreviation "PCD," refers to the material that is produced by subjecting individual diamond crystals or grains to sufficiently high pressure and high temperature that intercrystalline bonding occurs between adjacent diamond crystals to form a network of diamond crystal-to-diamond crystal bonding. Polycrystalline diamond (PCD) materials of this invention are formed from a distribution of substantially exclusively coarse-sized diamond grains that are generally bonded together through the use of a catalyst material. PCD materials of this invention provide improved properties of impact resistance, fatigue resistance, and functional toughness, while maintaining an acceptable degree of wear resistance, when compared to conventional PCD materials prepared from the intentional use of fine-sized diamond grains.

FIG. 1 illustrates a microstructure of a PCD material 10 of this invention comprising a plurality of diamond grains 12 that are bonded to one another. A catalyst/binder material 14, e.g., cobalt, is used to facilitate the diamond-to-diamond bonding that develops during the sintering process into a diamond crystal bonded network. The catalyst/binder material used to facilitate diamond-to-diamond bonding can be provided generally in two ways. The catalyst/binder can be provided in the form of a raw material powder that is pre-mixed with the diamond grains or grit prior to sintering. Alternatively, the catalyst/binder can be provided by infiltration into the diamond material (during high temperature/high pressure processing) from an underlying substrate material that the final PCD material is to be bonded to.

After the catalyst/binder material has facilitated the diamond crystal-to-diamond crystal bonding, and the final diamond part is complete, the catalyst/binder material is generally distributed throughout the diamond network. Although the catalyst/binder material could be leached out of the diamond network to provide a "thermally stable" structure, it is typically left in to provide some toughness and additional diamond crystal bonding support.

In an example embodiment, diamond grains used to form the PCD material diamond phase have a grain size of greater than about 20 micrometers, and preferably in the range of from about 30 to 90 micrometers. Diamond grains sized greater than about 20 micrometers are referred to as "coarse-sized" diamond grains in this description for purposes of distinguishing the grains from smaller sized diamond grains or "fines" that are intentionally used for preparing those conventional PCD materials discussed above.

It is desired that PCD materials of this invention be formed by using substantially exclusively coarse-sized diamond grains, as it has been discovered that such use produces a final PCD product in roller-cone rockbits that displays improved properties of impact resistance and functional toughness when compared to conventional PCD materials formed by the intentional use of some amount of fine-sized diamond grains. While not wishing to be bound by a particular theory or mechanism, the resultant improvement in impact resistance and functional toughness is believed to be due to mechanisms of crack deflection and crack bridging.

While PCD materials of this invention are referred to as being formed substantially exclusively from coarse-grained diamond grains, it is to be understood that most post-sintered PCD materials of this invention will have some residual amount of small or fine-sized diamond grains (on the order of about 15 percent by volume or less). Although it is the practice of this invention to not intentionally use diamond grains having a grain size of 20 micrometers or less, the presence of a certain amount of residual fines in the diamond grain raw material may be unavoidable.

For example, in an example embodiment, a diamond grain product useful for forming PCD materials of this invention has a grain size of from about 36 to 54 micrometers, and can have up to about 10 percent by volume, and preferably less than about 5 percent by volume, residual diamond fines of 20 micrometers in size or smaller. This presence of this amount of fines in the otherwise coarse diamond grain product is believed to be unintentional and possibly unavoidably related to the process of packaging, transporting and otherwise handling the diamond grain product. This amount of unavoidable diamond fines in the diamond grain product does not have any appreciable effect on diminishing the desired improvement of impact resistance for the PCD material.

While it is the intent of this invention to use diamond grains that do not include intentionally added residual fines, it is to be understood that diamond grain materials having an acceptable amount of residual fines, whether present unintentionally or intentionally, can be used to prepare PCD materials of this invention and, thus are intended to be within the scope of this invention.

Residual diamond fines can also be introduced into the coarse-sized diamond powder during processing. For example, diamond fines can be produced via the process of making the desired raw diamond powder by powder milling and tape casting process. Additionally, various powder compaction methods, up to and including high temperature/high pressure sintering, can create unwanted diamond fines. In an example embodiment, using the same diamond powder product described above (comprising diamond grains having a size of from 36 to 54 micrometers), the process of ball milling can increase the volume fraction of diamond fines initially in the diamond grain product from approximately 2.5 percent to approximately 25 percent. Further processing of the ball milled product, in the form of tape casting, can increase the volume fraction of diamond fines from approximately 25 percent to 42 percent based on the total volume of the material.

Since the creation of diamond fines are a largely unavoidable consequence of the steps of processing diamond grains prior to sintering, unless such processing steps can be controlled, it is important that the amount of diamond fines in the starting diamond grain product be controlled to the desired maximum discussed above. The control of diamond grain size, and related use of substantially coarse-sized diamond grains, is important to provide post sintered PCD materials having desired improved properties of impact resistance and toughness while retaining a sufficient level of wear resistance for use, e.g., as rock bit inserts, in particular subterranean drilling applications. For example, use of substantially coarse-sized diamond grains produces a post sintered PCD material having 15 percent by volume or less diamond fines, thereby providing a material microstructure capable of providing the above-discussed desired mix of performance properties.

Since the amount of diamond fines present in the diamond grain product, used to form PCD materials of this invention, can be controlled by choice of raw material and method of processing, it is to be understood that one or both can be manipulated within the scope of this invention to provide the desired control over diamond fines present in the pre-sintered PCD material.

It is, therefore, to be understood that although the maximum amount of fine-sized diamond grains, used to prepare PCD materials of this invention, is carefully controlled, up to about 15 percent by volume diamond fines may be present in the sintered microstructure of this invention from the sources discussed above. As mentioned above, the presence of up to about 15 percent by volume diamond fines in the post sintered PCD material provides a desired degree of impact resistance, toughness, and wear resistance for some applications. The exact amount of diamond fines present in PCD materials of this invention will depend on the particular application. For example, a PCD material comprising approximately 10 percent by volume diamond fines sized 20 micrometers or less can be well suited for use as a wear surface on a rock bit insert.

Accordingly, for purposes of distinguishing PCD materials of this invention from conventional PCD materials formed from the intentional use of fine-sized diamond grains, post sintered PCD materials of this invention are referred to as either being: (1) substantially free from diamond grains having a grain size of 20 micrometers or less; and/or (2) being prepared substantially exclusively from coarse-sized diamond grains of greater than 20 micrometers.

PCD materials formed without controlling the maximum amount of fine-sized diamond grains sized 20 micrometers or less, without additional process and/or material composition enhancements, will not have an amount of course-sized diamond grains present in the sintered microstructure to provide a sufficient increase in functional toughness over conventional PCD that is suitable for use of the final PCD product in certain extreme wear applications, e.g., as on a working surface of a subterranean drill bit.

The properties of toughness and wear resistance are considered to be the most important properties of PCD, and they are inversely related to one another, i.e., as one of the properties is improved, the other is reduced. As the diamond grain size used to form PCD materials increases, toughness typically increases and wear resistance typically decreases. Thus, maximum diamond grain size used to form PCD materials is determined by the toughness and wear resistance requirement called for by a particular PCD material application.

In the example application of PCD inserts installed on a petroleum roller-cone rock bit, wear of the PCD insert is not a current failure mode. Rather, the current failure mode is diamond chipping and spalling due to fatigue and impact. The exact amount of wear resistance that can be sacrificed to increase toughness and impact resistance has not been established. Accordingly the maximum diamond grain size beneficial to overall PCD insert performance is unknown at this time.

Formations drilled by rock bits vary considerably in terms of hardness, strength and abrasiveness. Therefore, it is to be understood that the large diamond grain size useful for forming PCD inserts used in rock bits will vary according to the formations being drilled to optimize overall performance. In a preferred embodiment, PCD materials of this invention used to form inserts for a rotary-cone rock bit are formed by using diamond grains having a grain size in the range of from about 35 to 55 micrometers.

The catalyst/binder material 14 can be selected from those binder materials/metals used to form conventional PCD materials such as Co, Ni, Fe, and mixtures and alloys thereof, as well as materials known to those skilled in the art. As discussed above, the properties of toughness and wear resistance of the PCD material are inversely related to one another, and are dependent on the relative amounts of catalyst/binder material and diamond grains that are used. The presence of diamond grains, and related diamond-to-diamond bonding, is necessary to provide desired properties of high strength and wear resistance to the PCD material. However, too many diamond grains or excessive diamond bonding in the PCD material can produce low chipping resistance.

The presence of the catalyst/binder material in the PCD material can help to improve chipping resistance, but can adversely impact PCD material properties of high strength and wear resistance. Therefore, the amount of catalyst/binder material that is used to form the PCD material is preferably that amount that provides a desired improvement in chipping resistance without significantly impacting strength and wear resistance.

Cobalt (Co) is a preferred catalyst/binder material. PCD materials of this invention are formed using up to about 50 percent by volume of the catalyst/binder material based on the total volume of the material. Using more than about 50 percent by volume of the catalyst/binder material will provide a PCD material having properties of hardness and wear resistance that may not be sufficient for use in extreme working environments, e.g., as a working surface on a subterranean drill bit, as the high amount of catalyst/binder material will significantly reduce the overall amount of diamond-to-diamond bonding, as well as reduce the amount of diamond crystals, which significantly reduces the wear resistance of the PCD In a preferred embodiment, PCD materials of this invention comprise in the range of from 50 to 95 percent by volume of the coarse-sized diamond grains based on the total volume of the material.

Cobalt is provided in the form of powder having a grain size in the range of from about one to three micrometers. Using a Co catalyst/binder material having a grain size within this range is desired because it minimizes residual voids in the microstructure. In an example embodiment, a PCD material is prepared according to this invention by using approximately ten percent by volume Co as a premix material, i.e., as a material that is combined with the diamond powder before sintering. Alternatively, the catalyst/binder material can be provided to the diamond powder by infiltration from a binder-containing substrate material during the sintering process.

PCD materials of this invention are initially formed from a mixture of diamond grains and catalyst/binder powder that is formed into the shape of a desired part, and that can be sintered by conventional high-temperature high-pressure (HT/HP) process to form a desired PCD construction. Pre-sintered parts are formed by combining diamond grains or grit having the above-described coarse grain size, with a suitable catalyst/binder material, e.g., Co, in the desired proportions. The diamond grains and catalyst/binder material are thoroughly mixed together by conventional method and are formed into a desired shape for use with the final application product. For example, when used as a working surface on a subterranean drill bit insert, the pre-sintered part can be formed into a shape that will cover a surface portion of an insert substrate formed, e.g., from tungsten carbide-cobalt. Alternatively, if desired, the entire part can be formed from the PCD material. The so-formed pre-sintered part is sintered by HT/HP process for diamond synthesis. The sintered product contains the PCD material of this invention.

PCD materials, and PCD products formed therefrom, prepared according to the principles of this invention will become better understood and appreciated with reference to the following example:

EXAMPLE

Diamond grains having a grain size of approximately 36 to 54 micrometers were mixed with Co powder having an approximate grain size of about two micrometers. The distribution of diamond grain sizes for the 36 to 54 micrometer diamond grain powder was as follows: approximately 50 percent by volume 43 to 47 micrometer diamond grains; and approximately 90 percent by volume less than or equal to 60 micrometer diamond grains. The mixture comprised approximately 90 percent by volume diamond grains and the remaining amount Co. The mixture was prepared for forming an insert used with a rotary-cone rock bit, according to conventional known practices, and comprised less than about 15 percent by weight unintentionally present and unavoidable diamond fines having a grain size of 20 micrometers or less. A pre-sintered part was formed from the mixture. The pre-sintered part was sintered according to conventional HT/HP parameters and produced a PCD material having a microstructure comprising 15 percent by volume or less fine-sized diamond grains based on the total volume of the material.

PCD constructions, formed from PCD materials of this invention, can have a material microstructure consisting exclusively of the PCD material itself, i.e., the entire microstructure can be a homogeneous arrangement of the diamond crystals bonded together with a catalyst/binder material (as illustrated in FIG. 1). PCD constructions, formed from PCD materials of this invention, can also have a material microstructure comprising two or more material phases where the PCD materials of this invention is at least one of the material phases. Further, the two or more material phases can be arranged within the microstructure in either a random or ordered/oriented fashion.

An example PCD construction comprising the PCD material of this invention as one material phase, e.g., a hard phase, in an oriented multi-phase material microstructure is described in U.S. Pat. No. 6,063,502, which is incorporated herein by reference, comprising an ordered/oriented arrangement of a first material phase of the PCD material, and a second material phase of another material. An example PCD construction comprising the PCD material of this invention as one material phase in a randomly arranged multi-phase material microstructure can be one including the PCD material as a first hard material phase that is randomly distributed within a second continuous material phase of a second material, e.g., a catalyst/binder material such as WC—Co and the like. It is to be understood that these are only but a few examples of how PCD materials of this invention can be used to form PCD constructions having both an ordered/oriented and randomly arranged multi-phase material microstructure. It is, therefore, to be understood that many other example uses of PCD materials to form such multi-phase PCD constructions is both possible and is intended to be within the scope of this invention.

PCD carbide composites of this invention can be used to form wear and cutting components in earth-boring tools such as roller cone bitscommonly used in the mining and petroleum drilling industry. PCD materials can be used to form a wear surface in such applications in the form of one or more substrate coating layers, or can be used to form the entire component itself.

FIG. 2, for example, illustrates a mining or petroleum drill bit insert 24 that is either formed entirely from or that has a working surface 25 comprising the PCD material of this invention. Again, it is to be understood that the PCD material can be the only material phase of this and the following example PCD constructions, or can be one or more phases of an ordered/oriented or random multi-phase material microstructure. Referring to FIG. 3, such an insert 24 can be used with a roller cone drill bit 26, comprising a body 28 having three legs 30, and a cutter cone 32 mounted on a lower end of each leg. The inserts 24 are provided along the surfaces of the cutter cone 32 for bearing on a rock formation being drilled.

PCD materials of this invention, formed by using substantially exclusively coarse-sized diamond grains, display improved properties of functional toughness when compared to conventional PCD materials formed by intentionally using a fine-sized diamond grain component. FIG. 4 illustrates graphically the reduced probability failure that rock bit inserts formed from PCD materials of this invention display when compared to conventional PCD materials. Specifically, FIG. 4 illustrates that the probability of failure for rock bit inserts comprising a surface formed from the PCD material of this invention is much less at a given impact failure height than that of a rock bit insert comprising a surface formed from a conventional PCD material. For example, at an impact failure height of approximately 75 inches, the probability of failure is reduced from approximately 80 percent (for a rock bit insert comprising a conventional PCD material) to approximately 20 percent (for an equally-sized rock bit insert comprising the PCD material of this invention), which represents a substantial improvement in functional toughness.

Although, limited embodiments of PCD materials, methods of making the same, and applications for the same, have been described and illustrated herein, many modifications and variations will be apparent to those skilled in the art. Additionally, although PCD materials of this invention have been described as being useful to form a working surface on a particular substrate, it is to be understood within the scope of this invention that PCD materials of this invention can also be used to form multiple-layer structures, or to form the entire insert itself, thus not requiring a substrate. Accordingly, it is to be understood that within the scope of the appended claims, PCD materials according to principles of this invention may be embodied other than as specifically described herein.

What is claimed is:

1. A polycrystalline diamond material prepared by the process of:
    forming a mixture consisting essentially of substantially exclusively coarse-sized diamond grains and a catalyst/binder material, the diamond grains having a grain size of greater than about 20 micrometers and comprising 85 percent by volume or more of the total volume of the mixture, wherein the catalyst/binder material is selected from the group consisting of Co, Ni, Fe, and mixtures thereof, and wherein diamond grains having a grain size of 20 micrometers or less are not intentionally added during the step of combining to form the polycrystalline diamond material; and pressurizing the mixture under elevated temperature conditions to form the polycrystalline diamond material.

2. The polycrystalline diamond material as recited in claim 1 wherein the coarse-sized diamond grains consist of particles having a single avenge particle size distribution.

3. The polycrystalline diamond material as recited in claim 1 wherein coarse-sized diamond grains have a grain size in the range of from about 35 to 60 micrometers.

4. A polycrystalline diamond material prepared by the process of:

combining substantially exclusively coarse-sized diamond grains with a catalyst/binder material to form a mixture, the diamond grains having a grain size of greater than about 20 micrometers and comprising 85 percent by volume or more of the total volume of the mixture, wherein diamond grains having a grain size of 20 micrometers or less are not intentionally added during the step of combining to form the polycrystalline diamond material; and pressurizing the mixture under elevated temperature conditions to form the polycrystalline diamond material;

wherein the polycrystalline diamond material comprises at least one material phase of a polycrystalline diamond construction having a multi-phase material microstructure.

5. The polycrystalline diamond construction as recited in claim 4 comprising an ordered arrangement of each material phase.

6. The polycrystalline diamond construction as recited in claim 4 comprising a random arrangement of each material phase.

7. A rotary cone rock bit comprising a bit body including at least one journal pin extending from a leg portion of the bit, a cutter cone rotatably mounted on the journal pin, and an insert disposed along a surface of the cutter cone, the insert comprising the polycrystalline diamond material as recited in claim 1 disposed along a working surface of the insert.

8. A polycrystalline diamond material that is prepared by:

combining materials selected from the group consisting essentially of substantially exclusively coarse-sized diamond grains and a catalyst/binder material, without the intentional use of fine-sized diamond grains having a grain size of 20 micrometers of less, the coarse-sized diamond grains sized in the range of from 30 to 90 micrometers, and wherein the catalyst/binder material is selected from the group consisting of Co, Ni, Fe, and mixtures thereof;

mixing together the coarse-sized diamond grains and the catalyst/binder material to form a mixture;

processing the mixture into a desired green part; and pressurizing under elevated temperature conditions the green part to form the polycrystalline diamond material.

9. The polycrystalline diamond material as recited in claim 8 wherein after the processing step the diamond grain and catalyst/binder mixture comprises greater than 90 percent by volume coarse-sized diamond grains based on the total volume of the mixture.

10. The polycrystalline diamond material as recited in claim 8 wherein the coarse-sized diamond grains consist of particles having a single average particle size distribution.

11. An earth-boring drill bit comprising:

a number of drill bit inserts attached thereto;

wherein the drill bit inserts comprise a carbide substrate and a polycrystalline diamond material disposed along a working surface of the substrate, the polycrystalline diamond material being prepared by forming a mixture of diamond grains and catalyst/binder, the diamond grains consisting essentially of substantially exclusively of coarse-sized diamond grains in the range of from 30 to 90 micrometers, and wherein the catalyst/binder material is selected from the group consisting of Co, Ni, Fe, and mixtures thereof.

12. The drill bit as recited in claim 11, wherein the polycrystalline diamond material is prepared by:

processing the diamond grain and binder mixture into a desired green part; and pressurizing under elevated temperature conditions the green part to form the polycrystalline diamond material.

13. The drill bit as recited in claim 12 wherein the polycrystalline diamond material comprises less than about 10 percent by volume fine-sized diamond grains sized 20 micrometers or less based on the total volume of the mixture.

14. The drill bit as recited in claim 12 wherein a major volume of the diamond grains, based on the total volume of the diamond grains used to form the green part, is sized in the range of from 35 to 55 micrometers.

15. The drill bit as recited in claim 11 wherein the polycrystalline diamond material is formed by using greater than 90 percent by volume coarse-sized diamond grains based on the total volume of the mixture.

16. The drill bit as recited in claim 11 wherein the coarse-sized diamond grains consist of particles having a single average particle size distribution.

17. The drill bit as recited in claim 11 wherein the polycrystalline diamond material is formed using up to about 50 percent by volume binder/catalyst material.

18. The drill bit as recited in claim 11 wherein the mixture comprise in the range of from about 50 to 95 percent by volume diamond grains based on the total volume of the mixture.

19. The drill bit as recited in claim 11 wherein the polycrystalline diamond material is at least one material phase of a polycrystalline diamond construction having a multi-phase material microstructure.

20. The drill bit as recited in claim 19 wherein the polycrystalline diamond construction comprises an ordered arrangement of multiple material phases.

21. The drill bit as recited in claim 19 wherein the polycrystalline diamond construction comprises a random arrangement of multiple material phases.

22. The drill bit as recited in claim 11 further comprising:

a bit body including at least one journal pin extending from a leg portion of the bit; and a cutter cone rotatably mounted on the journal pin;

wherein the drill bit inserts are disposed along a surface of the cutter cone.

23. A rotary cone rock bit comprising:

a bit body including at least one journal pin extending from a leg portion of the bit;

a cutter cone rotatably mounted on the journal pin; and an insert disposed along a surface of the cutter cone, the insert comprising a carbide substrate and a polycrystalline diamond material disposed along a surface of the substrate, the polycrystalline diamond material being formed from a mixture consisting essentially of substantially exclusively coarse-sized diamond grains and catalyst/binder, the catalyst/binder selected from the group consisting of Co, Ni, Fe, and mixtures thereof, the mixture being formed without the intentional addition of fine-sized diamond grains having a grain size of 20 micrometers of less, the mixture comprising greater than 85 percent by volume diamond grains having a single average particle size distribution sized in the range of from 30 to 90 micrometers.

24. The rock bit as recited in claim 23, wherein the polycrystalline diamond material is prepared by:
   processing the mixture into a desired green part; and
   pressurizing under elevated temperature conditions the green part to form the polycrystalline diamond material.

25. The rock bit as recited in claim 23 wherein the polycrystalline diamond material comprises less than about 95 percent by volume coarse-sized diamond grains based on the total volume of the mixture.

26. The rock bit as recited in claim 23 wherein the polycrystalline diamond material is at least one material phase of a polycrystalline diamond construction having a multi-phase material microstructure.

27. The rock bit as recited in claim 26 wherein the polycrystalline diamond construction comprises an ordered arrangement of multiple material phases.

28. The rock bit as recited in claim 26 wherein the polycrystalline diamond construction comprises a random arrangement of multiple material phases.

* * * * *